(No Model.) 2 Sheets—Sheet 1.
J. L. BARKER.
BAND CUTTER AND FEEDER.
No. 545,935. Patented Sept. 10, 1895.
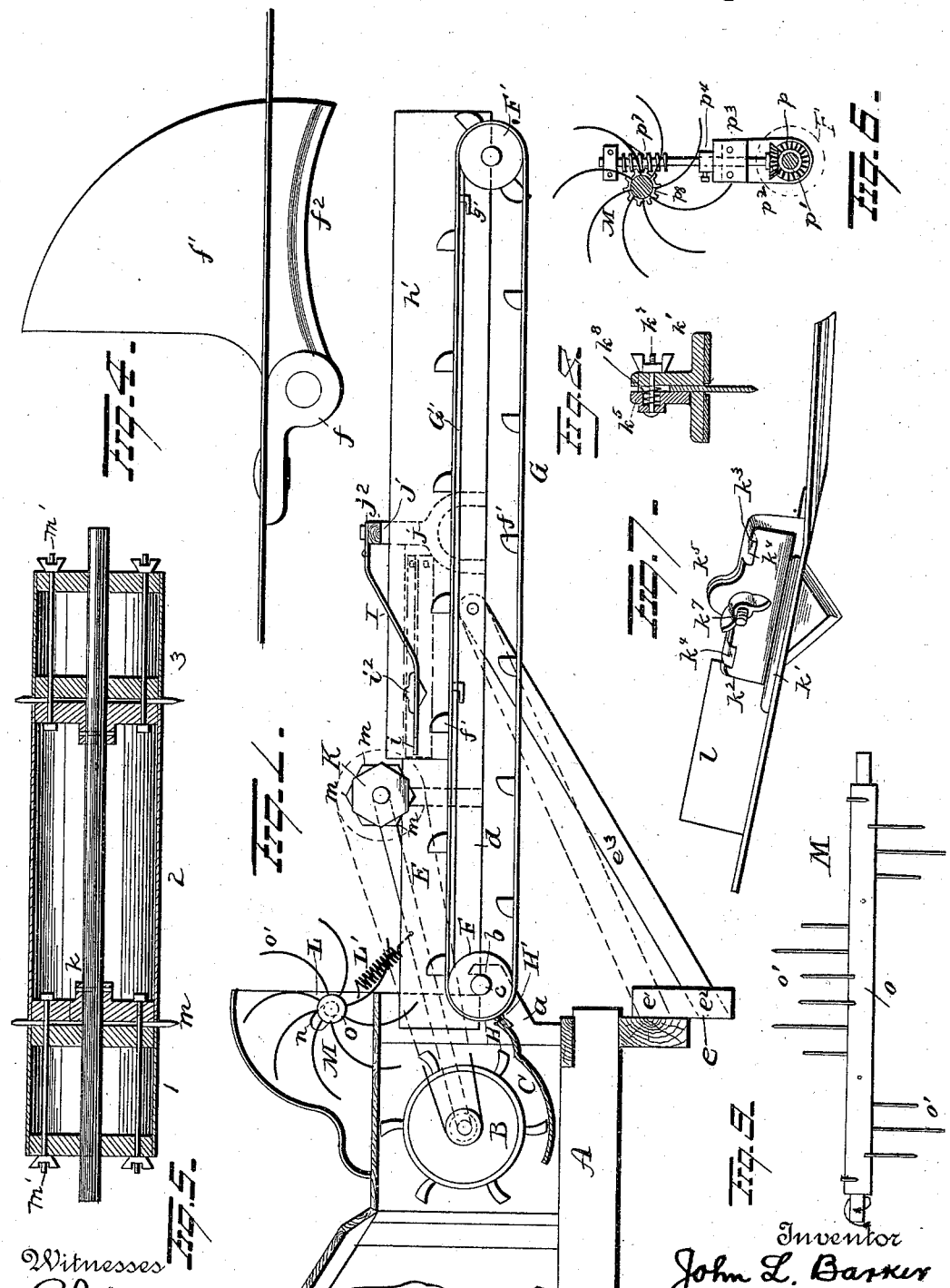
Witnesses
E. J. Nottingham
G. F. Downing
Inventor
John L. Barker
By H. A. Seymour
Attorney

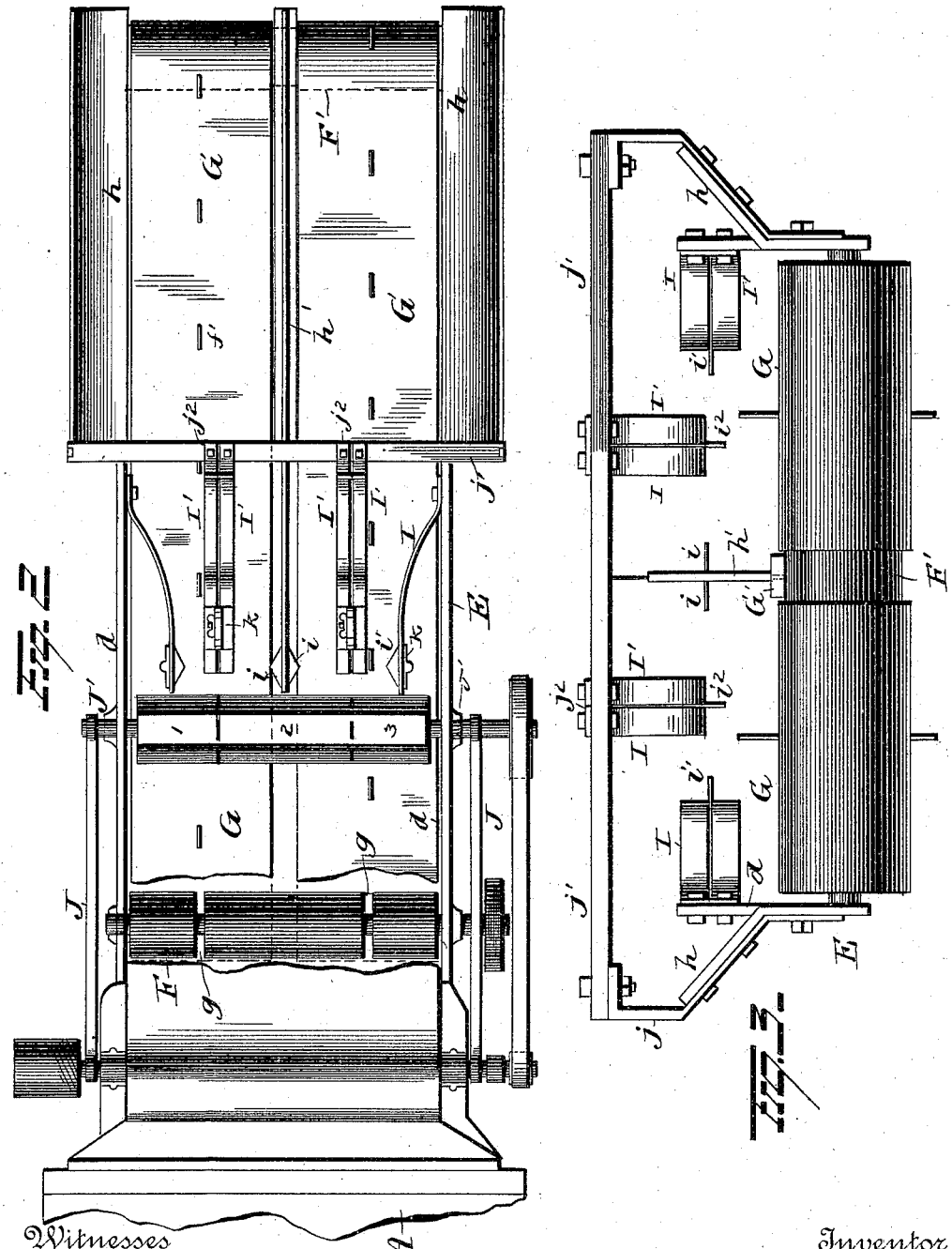

UNITED STATES PATENT OFFICE.

JOHN L. BARKER, OF RACINE, WISCONSIN.

BAND-CUTTER AND FEEDER.

SPECIFICATION forming part of Letters Patent No. 545,935, dated September 10, 1895.

Application filed August 4, 1892. Serial No. 442,176. (No model.)

*To all whom it may concern:*

Be it known that I, JOHN L. BARKER, a citizen of the United States, residing at Racine, in the county of Racine and State of Wisconsin, have invented certain new and useful Improvements in Band-Cutters and Feeders; and I do hereby declare the following to be a full, clear, and exact description of the invention, such as will enable others skilled in the art to which it appertains to make and use the same.

My invention relates to an improvement in band-cutters and feeders for thrashers, its object being to provide simple and efficient devices for insuring the cutting of the bands at the proper time.

A further object is to construct the machine in such manner that loose grain, chaff, &c., will be prevented from working their way under the carrier.

A further object is to construct band-cutters or knives for a band-cutter and feeder in such manner that said cutters or knives will be yieldingly forced toward or against the bundles of grain.

A further object is to so construct the knives and their holders that the bundles of grain will not be retained by them, and so as to hold the bundles down firmly on the apron or carrier both before and after the band reaches the knives, and also to press the straw down firmly on each side of each knife.

A further object is to so construct and arrange a feed-board for a band-cutter and feeder that the grain will be fed to the thrashing-cylinder in such manner that clogging will be prevented.

A further object is to provide a band-cutter and feeder with an improved beater having knives secured thereto, said beater being adapted to assist in feeding or carrying the grain forward.

A further object is to provide a band-cutter and feeder with an improved governor adapted to regulate the feed of the grain from the device to a thrashing-machine.

A further object is to produce a band-cutter and feeder which shall be simple in construction and effectual in the performance of its functions.

With these objects in view the invention consists in certain novel features of construction and combinations and arrangements of parts, as hereinafter set forth, and pointed out in the claims.

In the accompanying drawings, Figure 1 is a sectional view illustrating my improved band-cutter and feeder. Fig. 2 is a plan view. Fig. 3 is an end view. Figs. 4, 5, 6, 7, and 8 are detail views.

A represents the frame; B, the cylinder, and C the concave of an ordinary thrashing-machine. A casting $a$ is secured to the frame A and is made with sockets $b$ for the reception of the journals $c$ at one end of the frame $d$ of the carrier E. Brackets $e$ depend from the frame A and are made with sockets $e'$ $e^2$ for the reception of one end of braces $e^3$, the other ends of said braces being pivotally connected to the frame $d$ of the carrier at points between its ends. When the lower ends of the braces $e^3$ are in the lower sockets $e'$ of the brackets $e$, the carrier-frame will be supported in a horizontal position; but when the lower ends of said brackets are in the upper sockets $e^2$ of the brackets $e$ the carrier-frame will be elevated somewhat, whereby to facilitate the transportation of the machine over roads, &c. A roller F is mounted at one end of the carrier-frame $d$, and a roller $f'$ is mounted at the other end, over which rollers endless aprons G pass, said aprons being adapted to pass over and in close proximity to a table or platform G'. To the under side of each apron G a bracket $f$ is secured, to each of which a hook or plate $f'$ is hinged, said hooks or plates being adapted to pass upwardly through slots in the aprons, their lower edges being preferably widened and curved, as at $f^2$, whereby to facilitate their passage over the rollers F F' and to prevent them from coming clear up through the apron, which might happen when the cylinder "jerks" a bundle of flax. Between the concave C and the carrier E a curved feed-board H is located, the upper end of which is provided with a brush H', adapted to bear against the aprons as they pass over the roller F and remove all the grain, &c., therefrom, thus preventing any material—such as grain, chaff, &c.—from passing under the carrier. In order to permit the brush of the feed-board to bear against the aprons throughout their entire width and still permit the passage of the hooks or plates $f'$, the roller F is provided with annular slots or recesses $g$, as shown in Fig. 1, whereby the hooks or plates will be allowed to pass the roller without conflicting with the feed-board.

The carrier-frame d is provided with flaring side boards h to facilitate the feeding of the grain into the same. The carrier is also provided with a center board h', secured at each end to the platform G' between the two aprons by means of hooks g', and to the forward end of which V-shaped cutters i are secured, said cutters or knives being so arranged as to leave a flat face of the center board exposed at each side thereof, these knives or cutters being designed to cut such bands as may come into contact therewith.

To the sides of the carrier-frame d inwardly and forwardly projecting spring-arms I are secured, and carried by the free end of said spring-arms are inwardly-projecting V-shaped knives i'. Brackets j project upwardly and laterally from the sides of the carrier-frame d, and to their upper ends a cross-bar j' is secured. To this cross-bar and over each apron or carrier E a bracket $j^2$ is secured, to which bracket-arms I' are hinged. These arms may be made of spring metal the same as the spring-arms I, or they may be made of straight metallic bars, and at their free ends they support depending V-shaped knives $i^2$. Each arm I I' is preferably made in two parts, arranged side by side, and have secured thereto knife-holders k, which extend over both sections of the arms and are secured thereto. The body of each holder comprises a base-plate k', Fig. 7, and an upwardly or laterally projecting plate $k^2$, the latter being provided with recesses $k^3$ for the reception of shoulders $k^4$, projecting from a clamping-plate $k^5$. The plates $k^2$ and $k^5$ are made with aligned perforations for the accommodation of a clamping-screw $k^7$. The opening or perforation in the clamping-plate $k^5$ is enlarged somewhat for the accommodation of a coiled spring $k^8$, which when the clamping-screw is loosened is adapted to force said clamping-plate from the plate $k^2$, and thus readily release the knife which is inserted between said plates, whereby the renewal of the knives will be facilitated. The knives are inserted between the plates $k^2$ and $k^5$, and project through slots in the base-plates k'. The hinged arms I' are further provided, preferably at their free extremities, with weights l, whereby said arms and the knives carried thereby will be made to bear on the bundles of grain passing under them with a uniform pressure.

An important feature of the construction and arrangement of band-cutters above described is the flat bearing-faces extending on each side of and projecting beyond the ends of the knives. The object of this construction is to hold the bundles down firmly on the apron or carrier, both before and after the band reaches the knives, and also to press the straw down firmly on each side of the knives. This is very important, as a thin knife secured to a thin strip of metal and projecting edgewise down into a bundle of grain will hold the bundle and allow the apron or carrier to pass under it, and if a bundle does move forward a knife so arranged will only hold into the end of the bundle with such force as to cause the bundle to turn end for end and pass under the knife without cutting the band. It is also important that the band-cutters resting on the top of the bundle should be arranged to exert their full pressure before the bundle is brought into contact with the side springs, otherwise the bundle would be held between the side springs and center board and the apron or carrier would pass freely under the bundle without moving it. The knives carried by the side spring are therefore arranged in advance of the top knives, as shown in Fig. 2. The knives i', carried by the side spring arms I, will cut such bands as come into contact therewith, and said arms will tend to force the bundles toward the knives i, carried by the center board.

The curved shape of the feed-board H, above alluded to, is an important feature of my invention, for the reason that when a bundle of grain reaches the cylinder of the thrasher the end of the bundle will be made to stand on the curved feed-board, while the cylinder combs off a portion of the bundle, while the remainder of the bundle remains standing on end on the curved feed-board until forced into the cylinder by the next bundle. This feeding of one-half the bundle at a time prevents clogging, which is a great objection in many feeders. Pivotally connected at their forward ends to the journals of the cylinder B of the thrasher are two arms J J, which extend rearwardly and upwardly and rest upon suitable supports J', attached to the sides of the carrier-frame d. The arms J J are provided at their outer or rear ends with suitable boxes for carrying a beater K, which is preferably hexagonal in shape. This beater is made in three sections 1 2 3, each section comprising two boards covered with sheet-iron or other sheet metal. In the spaces k, between the sections, V-shaped knives m are inserted and retained in place by means of bolts m' passing lengthwise through the sections of the beater. These knives, as well as the knives above described, extend but a short distance from the surface of their supports, thus providing flat faces at the base of the same. The beater K is driven by a belt from the shaft of the cylinder B, and is designed to assist in conveying the grain to the thrasher and in cutting the bands. In order to lessen the pressure of the beater on the bundle passing under it, the arms J J are connected with the housing L by means of a spring L'. Projecting from the frame A is the housing L, in the end walls of which curved slots n are made, said slots being concentric with the cylinder B and receive the journals of a governor M or the boxes which carry said journals, so that said governor can rise and fall without changing the distance from the cylinder. The governor M is constructed by employing a series of curved fingers $o'$, preferably square in cross-section and pointed at their ends. The fingers $o'$ are secured in the wooden shaft or drum $o$, and are arranged in the form of a double spiral and extend to within a few inches of the apron or carrier. The governor is designed to revolve very slowly, and while its fingers do not interfere with a reasonable quantity of grain passing into the machine, any unusual quantity will be held in check by said fingers and will be fed into the machine from side to side by means of the spiral arrangement of the fingers, thereby not exposing the whole length of the cylinder at any one time, and does not feed in a succession of bunches, as would be the case were the fingers placed in a straight line. This spiral arrangement of the fingers of the governor is important, especially in feeding flax. The fingers revolving slowly, the cylinder of the thrasher is made to comb the flax through the fingers, very much as a man would let it pass through his fingers. In order to drive the governor M, a bevel-pinion $p$ is mounted on a shaft $p'$ in proximity to one end of the roller F and meshes with a bevel-pinion $p^2$, carried by a shaft $p^3$, said pinion $p^2$ being retained in proper position by means of an adjustable collar $p^4$. In proximity to the upper end of the shaft $p^3$ a worm $p^7$ is located and is adapted to mesh with a work-wheel $p^8$, carried by the governor M.

Having fully described my invention, what I claim as new, and desire to secure by Letters Patent, is—

1. In a band cutter and feeder, the combination with rollers and an endless apron passing over said rollers and provided with slots, of a series of brackets secured to said apron, hooks or plates having curved under edges adapted to conform to said rollers, hinged to said brackets, and a floor or platform located under and in close proximity to the upper portion of said apron, substantially as set forth.

2. In a band cutter and feeder, the combination with an endless carrier, and a curved feed board at one end thereof and adapted to rest in close proximity to said apron, of hinged hooks or plates carried by said carrier, and rollers over which said carrier passes, one of said rollers being made with annular recesses for the accommodation of said hooks so that the latter will not conflict with said feed board, substantially as set forth.

3. The combination with the carrier of a band cutter and feeder, of a curved feed board in proximity to one end thereof, and a brush secured to one end of said feed board and adapted to bear against said carrier to clean the latter and serve as a valve to prevent the passage of the material between the concave and the carrier, substantially as set forth.

4. In a band cutter and feeder, the combination with an endless carrier and its frame, of spring arms secured to the sides of the frame, and inwardly projecting knives carried by the free ends of said spring arms, substantially as set forth.

5. In a band cutter and feeder, the combination with an endless carrier, of knives arranged over said endless carrier, said knives projecting downwardly toward the carrier and inwardly toward each other, substantially as set forth.

6. In a band cutter and feeder, the combination with an endless apron, of a series of knives supported over the same, spring devices for supporting said knives, said knives being secured approximately centrally to their holding devices so that a portion of said supporting devices will project at both sides and ends of the knives, substantially as and for the purpose set forth.

7. In a band cutter and feeder, the combination with a carrier, of arms having plates connected therewith between which a knife blade is held, and means for securing them together to clamp the blade, substantially as set forth.

8. In a band cutter and feeder, the combination with a carrier, of arms hinged above said carrier, and adapted to rest on the material passing over the same, weights on said arms, and knives carried by said arms, substantially as set forth.

9. In a band cutter and feeder, the combination with a carrier and its frame, of brackets secured to the sides of the frame and extending above the same, a cross bar secured at its ends to said brackets, brackets secured to said cross bar, arms hinged to the last mentioned brackets, knives carried by said arms and weights also carried by said arms, substantially as set forth.

10. In a band cutter and feeder, the combination with an arm, of a clamp secured thereto, said clamp comprising a base plate, a plate extending perpendicularly thereto and having recesses in its free edge, and a clamping plate having lugs to enter said recesses, a clamping screw passing through the clamping plate and the plate adjacent thereto, a spring tending to force said plates apart, and a knife held between the clamping plate and the adjacent plate and extending through a slot in the base plate so as to leave flat faces on both sides and ends of said knife, substantially as set forth.

11. The combination with a feed apron, having hooks pivotally connected therewith, and roller-carrying the apron and having annular recesses in position to receive the hooks on their return, of a brush operating in connection with said feed apron and adapted to brush the latter just prior to its return and serve as a valve to prevent the passage of material at that point, substantially as set forth.

12. The combination with a cylinder, a concave concentric with the cylinder feed-board, and a feed apparatus, of a governor located in proximity to the cylinder feed board and feed apparatus, and a beater, substantially as set forth.

13. The combination with a frame, a cylinder and feed apron, of a governor yieldingly supported and capable of adjusting itself to admit the passage of any required volume of grain, and a many sided rotary beater capable of rising and falling as large or small bundles of grain pass beneath it, substantially as set forth.

In testimony whereof I have signed this specification in the presence of two subscribing witnesses.

JOHN L. BARKER.

Witnesses:
  IRA J. MCMULLEN,
  ERASTUS C. PECK.